(12) United States Patent
Learned et al.

(10) Patent No.: US 11,281,791 B2
(45) Date of Patent: Mar. 22, 2022

(54) STREAMING MEDIA DISTRIBUTION MANAGEMENT

(71) Applicant: Sling TV L.L.C., Englewood, CO (US)

(72) Inventors: David Learned, Castle Rock, CO (US); Alexander Calfo, San Francisco, CA (US)

(73) Assignee: Sling TV L.L.C., Englewood, CO (US)

( * ) Notice: Subject to any disclaimer, the term of this patent is extended or adjusted under 35 U.S.C. 154(b) by 181 days.

(21) Appl. No.: 16/698,388

(22) Filed: Nov. 27, 2019

(65) Prior Publication Data

US 2021/0157946 A1 May 27, 2021

(51) Int. Cl.

| | |
|---|---|
| *G06F 21/62* | (2013.01) |
| *H04L 29/08* | (2006.01) |
| *H04L 29/06* | (2006.01) |
| *G06F 16/29* | (2019.01) |
| *H04L 67/52* | (2022.01) |
| *H04L 67/1097* | (2022.01) |

(52) U.S. Cl.
CPC .......... *G06F 21/6218* (2013.01); *G06F 16/29* (2019.01); *H04L 63/107* (2013.01); *H04L 67/1097* (2013.01); *H04L 67/18* (2013.01)

(58) Field of Classification Search
CPC ................. G06F 21/6218; G06F 16/29; G06F 2221/2111; G06F 16/9537; H04L 67/18; H04L 63/107; H04L 67/1097; H04L 67/2819
See application file for complete search history.

(56) References Cited

U.S. PATENT DOCUMENTS

| | | | | |
|---|---|---|---|---|
| 10,257,556 | B2 * | 4/2019 | Goetz | H04H 60/14 |
| 2008/0222705 | A1 * | 9/2008 | Goodmon | H04L 67/18 |
| | | | | 726/4 |
| 2009/0100003 | A1 * | 4/2009 | Lahtinen | H04L 67/16 |
| 2013/0260796 | A1 * | 10/2013 | Hasek | H04L 67/32 |
| | | | | 455/456.3 |
| 2014/0189067 | A1 * | 7/2014 | Gratton | G06F 21/10 |
| | | | | 709/219 |
| 2015/0065172 | A1 * | 3/2015 | Do | G06F 21/10 |
| | | | | 455/456.3 |
| 2016/0352797 | A1 * | 12/2016 | Marusich | H04L 67/18 |
| 2016/0357355 | A1 * | 12/2016 | Carrigan | H04L 65/403 |
| 2017/0223080 | A1 * | 8/2017 | Velayudhan | H04L 65/4084 |

(Continued)

FOREIGN PATENT DOCUMENTS

WO  WO-2021026509 A1 * 2/2021 ....... H04N 21/44209

*Primary Examiner* — Javier O Guzman
(74) *Attorney, Agent, or Firm* — Kilpatrick Townsend & Stockton LLP

(57) ABSTRACT

Various arrangements for geographical-based streaming media management are presented. Long-term and short-term streaming media records may be received. A master streaming media record database may be maintained that combines the long-term and short-term streaming media records. A geographical identifier can be received that indicates a streaming media access location and a record characteristic. The geographical identifier, the record characteristic, and the master streaming media record database may be analyzed. In response, record indications may be output from the master streaming media record database that indicate a streaming media permission scheme required to access the streaming media source.

20 Claims, 5 Drawing Sheets

(56) References Cited

U.S. PATENT DOCUMENTS

| | | | |
|---|---|---|---|
| 2017/0289598 A1* | 10/2017 | Labsky | H04N 21/4786 |
| 2018/0007148 A1* | 1/2018 | Nielsen | H04L 67/306 |
| 2020/0021661 A1* | 1/2020 | Nielsen | H04L 67/306 |
| 2020/0028898 A1* | 1/2020 | Sherf | H04L 67/1029 |
| 2020/0374587 A1* | 11/2020 | Mahrt | H04N 21/2541 |

* cited by examiner

400

| Date | Time | Streaming Media Source | First Char. | Second Char. | Permission Scheme | |
|---|---|---|---|---|---|---|
| 410 | 420 | 430 | 440 | 450 | | |
| 9/1/19 | 6:35 PM | Nat'l Sports Network | Colorado | Boston College | Access Level 1 | |
| Narrative: *To be streamed nationwide* | | | | | | 460-1 |
| 9/8/19 | 7:30 PM | Rocky Mtn Network | Wyoming | Colorado | Access Level 5 | |
| Narrative: *While streaming media source is available through access level 5, a geographic restriction is in place for the provided geographic identifier* | | | | | | 460-2 |
| 9/16/19 | 5:15 PM | Southeast Sports | Alabama | Colorado | Access Level 3 | |
| Narrative: *While streaming media source is available through access level 3, a local geographic restriction may be enforced, check back one week ahead of scheduled event for more information* | | | | | | 460-3 |
| 9/23/19 | 7:00 PM | National Network | Colorado | Washington | Not available | |
| Narrative: *Streaming Media Source not available* | | | | | | 460-4 |
| 9/30/19 | 5:00 PM | National Network | Colorado | Colo. Tech | Access Level 5 | |
| Narrative: *While streaming media source is available through access level 5, a local geographic restriction may be enforced by various regional affiliates of National Network, check back one week ahead of scheduled event for more information* | | | | | | 460-5 |

FIG. 4

STREAMING MEDIA DISTRIBUTION MANAGEMENT

BACKGROUND

Access to various data may be controlled based on geographic location. For instance, a user device may be permitted access to data if the user device being used to access the data is located in a first location but not if the user device is located in a second location. Not having access to particular data may be unexpected to a user and may prevent a user-access device from functioning as desired by the user. Embodiments detailed herein disclose arrangements for managing records such that access to the records is predictable.

SUMMARY

Various embodiments are described related to a method for geographical-based streaming media management. In some embodiments, a method for geographical-based streaming media management is described. The method may comprise receiving, by a cloud-based server system, a plurality of long-term streaming media records. Each long-term streaming media record of the plurality of long-term streaming media records may indicate a streaming media source mapped to a streaming media instance linked to the long-term streaming media record. The method may comprise receiving, by the cloud-based server system, a plurality of short-term streaming media records. The plurality of short-term streaming media records may be received after the plurality of long-term streaming media records. Each short-term streaming media record of the plurality of short-term streaming media records may indicate a streaming media source mapped to a streaming media instance linked to the short-term streaming media record. The method may comprise combining, by the cloud-based server system, the plurality of short-term streaming media records with the plurality of long-term streaming media records in a master streaming media record database. The method may comprise receiving, by the cloud-based server system from a user-access device, a geographical identifier that may indicate a streaming media access location and a record characteristic. The method may comprise analyzing, by the cloud-based server system, the geographical identifier, the record characteristic, and the master streaming media record database. The method may comprise outputting, by the cloud-based server system, based on the geographical identifier, the record identifier, a plurality of record indications from the master streaming media record database. Each record indication of the plurality of record indications may comprise the record characteristic; the streaming media source; and a streaming media permission scheme required to access the streaming media source based on the geographical identifier.

Embodiments of such a method may include one or more of the following features: At least one of the plurality of record indications may be based only on a long-term streaming media record of the plurality of long-term streaming media records. At least one of the plurality of record indications may be based on a short-term streaming media record of the plurality of short-term streaming media records. Combining the plurality of short-term streaming media records with the plurality of long-term streaming media records in the master streaming media record database may comprise updating a time period of at least one of the plurality of long-term streaming media records based on the time period of a short-term streaming media record of the plurality of short-term streaming media records. The method may further comprise streaming, by the cloud-based streaming media server system, streaming media mapped to the record characteristic and the streaming media source. The method may further comprise receiving, by a streaming media player device, the streaming media mapped to the record characteristic and the streaming media source based on the user-access device being mapped to the streaming media permission scheme required to access the streaming media source based on the geographical identifier. Combining the plurality of short-term streaming media records with the plurality of long-term streaming media records may comprise resolving characteristic and streaming media source mismatches between the plurality of short-term streaming media records and the plurality of long-term streaming media records. A long-term streaming media record may define a first geographic region excluded from permission to access to the streaming media. A short-term streaming media record of the plurality of short-term streaming media records may define a second geographic region that may be excluded from permission to access the record characteristic. The geographical identifier may be a zip code. The streaming media permission scheme may define access to a plurality of streaming media sources.

In some embodiments, a geographical-based streaming media management system is described. The system may comprise a record interface that may receive a plurality of long-term streaming media records. Each long-term streaming media record of the plurality of long-term streaming media records may indicate a streaming media source mapped to a streaming media instance linked to the long-term streaming media record. The system may comprise a record interface that may receive a plurality of short-term streaming media records. The plurality of short-term streaming media records may be received after the plurality of long-term streaming media records. Each short-term streaming media record of the plurality of short-term streaming media records may indicate a streaming media source mapped to a streaming media instance linked to the short-term streaming media record. The system may comprise a master streaming media record database. The system may comprise a record reconciliation engine that may combine the plurality of short-term streaming media records with the plurality of long-term streaming media records in the master streaming media record database. The system may comprise a query interface that may receive, from a user-access device, a geographical identifier that may indicate a streaming media access location and a record characteristic. The system may comprise a query engine that may analyze the geographical identifier, the record characteristic, and the master streaming media record database. The query interface may be further configured to output, based on the geographical identifier, the record identifier, a plurality of record indications from the master streaming media record database. Each record indication of the plurality of record indications may comprise the record characteristic; the streaming media source; and a streaming media permission scheme required to access the streaming media source based on the geographical identifier.

Embodiments of such a method may include one or more of the following features: At least one of the plurality of record indications may be based only on a long-term streaming media record of the plurality of long-term streaming media records. At least one of the plurality of record indications may be based on a short-term streaming media record of the plurality of short-term streaming media records. The record reconciliation engine may update a time period of at least one of the plurality of long-term streaming media records based on the time period of a short-term streaming media record of the plurality of short-term streaming media records. The system may further comprise a streaming media server that may stream streaming media mapped to the record characteristic and the streaming media source. The system may further comprise a streaming media player device that may receive the streaming media mapped to the record characteristic and the streaming media source based on the user-access device being mapped to the streaming media permission scheme required to access the streaming media source based on the geographical identifier. The record reconciliation engine may resolve characteristic and streaming media source mismatches between the plurality of short-term streaming media records and the plurality of long-term streaming media records. A long-term streaming media record may define a first geographic region excluded from permission to access to the streaming media. A short-term streaming media record of the plurality of short-term streaming media records may define a second geographic region that may be excluded from permission to access the record characteristic. The streaming media permission scheme may define access to a plurality of streaming media sources.

In some embodiments, a non-transitory processor-readable medium for geographical-based streaming media management is described. The non-transitory processor-readable medium may comprise processor-readable instructions configured to cause one or more processors to receive a plurality of long-term streaming media records. Each long-term streaming media record of the plurality of long-term streaming media records may indicate a streaming media source mapped to a streaming media instance linked to the long-term streaming media record. The one or more processors may receive a plurality of short-term streaming media records. The plurality of short-term streaming media records may be received after the plurality of long-term streaming media records. Each short-term streaming media record of the plurality of short-term streaming media records may indicate a streaming media source mapped to a streaming media instance linked to the short-term streaming media record. The one or more processors may combine the plurality of short-term streaming media records with the plurality of long-term streaming media records in a master streaming media record database. The one or more processors may receive, from a user-access device, a geographical identifier that may indicate a streaming media access location and a record characteristic. The one or more processors may analyze the geographical identifier, the record characteristic, and the master streaming media record database. The one or more processors may output based on the geographical identifier, the record identifier, a plurality of record indications from the master streaming media record database. Each record indication of the plurality of record indications may comprise the record characteristic; the streaming media source; and a streaming media permission scheme required to access the streaming media source based on the geographical identifier.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 4 illustrates an embodiment of graphic user interface defining streaming media access restrictions.

DETAILED DESCRIPTION

Depending on a geographical location of a user-access device and a streaming media permission scheme of the user-access device, the user-access device may or may not be permitted to access streaming media that is output by a streaming media server system. While the streaming media server system may be technically capable of streaming the media to anywhere that has a sufficiently high bandwidth Internet connection, other factors can be used to determine whether the user-access device is permitted to receive particular streaming media from a particular streaming media source.

Further, whether the user-access device is permitted to receive the streaming media may be difficult to predict far into the future. Multiple sources of data may be analyzed in order to make a long-term forecast as to whether the user-access device will be permitted to access the streaming media. A long-term forecast based on received long-term access data may be updated when short-term access data becomes available. Therefore, an initial projection may be created based on the long-term access data and may be updated based on later-received short-term access data. Since the long-term data and short-term data may be received from different sources, data fields may not match exactly. Combination and reconciliation processes may be performed to properly match streaming media records within the long-term data and the short-term data and resolve any mismatches.

In response to providing a geographical identifier and a record characteristic, a streaming media access management system can perform a search of data obtained from long-term access data and short-term access data to determine whether a user-access device will have access to the streaming media. The analysis performed by the streaming media access management system can be based on 1) the streaming media source; and 2) the streaming media permission scheme mapped to the user-access device.

Figure 1:
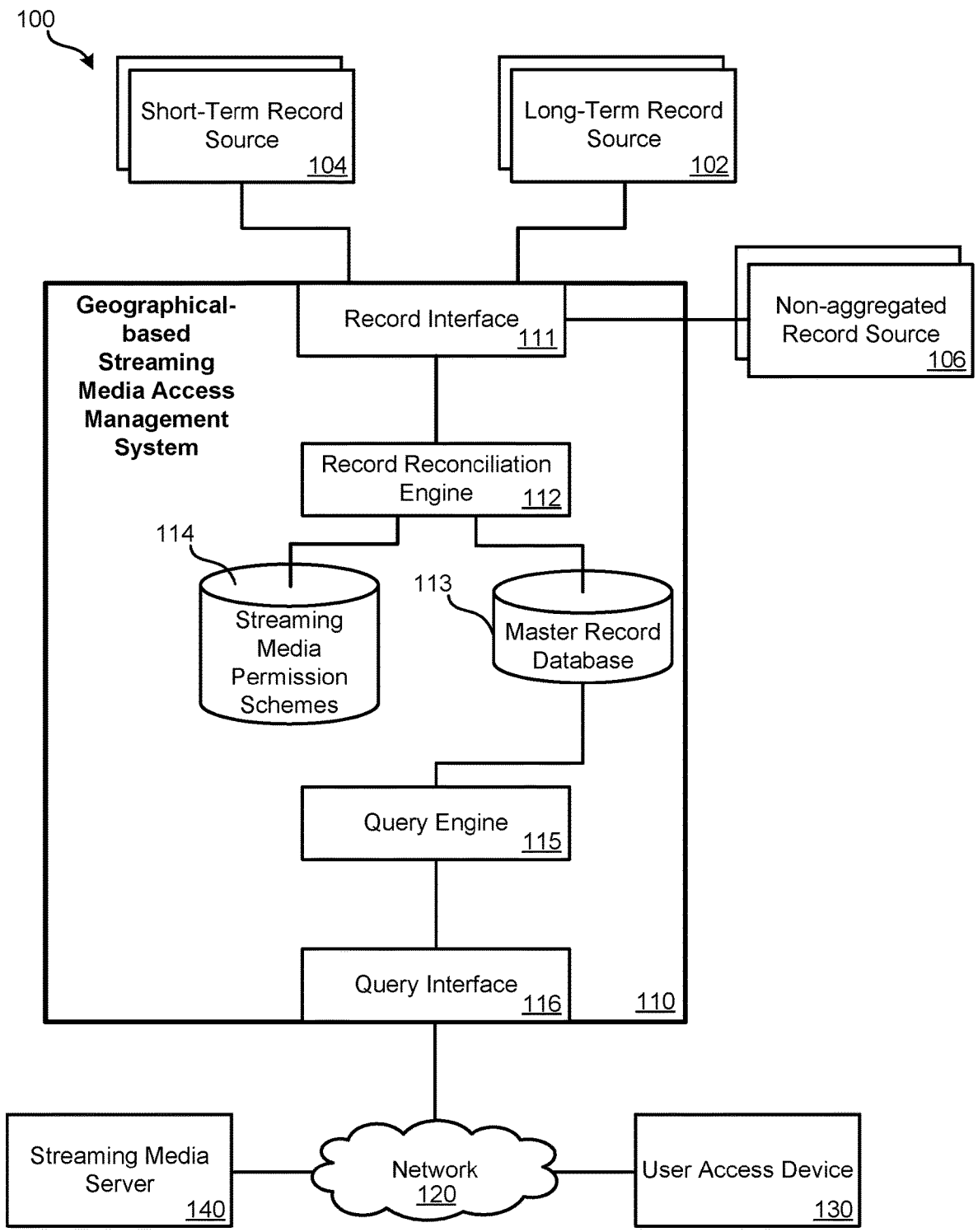
FIG. 1 illustrates an embodiment of a geographical-based streaming media access management environment.

Further detail regarding the specifics of various embodiments is provided in relation to the figures. FIG. 1 illustrates an embodiment of a geographical-based streaming media access management system environment 100, which is referred to herein as "environment 100." Environment 100 can include: geographical-based streaming media access management system 110 ("system 110"); long-term record source 102; short-term record source 104; non-aggregated record source 106; network 120; user-access device 130; and streaming media server 140.

System 110 may be computerized and include one or more non-transitory processor-readable mediums and a processing system. The processing system may include one or more special-purpose or general-purpose processors. Such special-purpose processors may include processors that are specifically designed to perform the functions detailed herein. Such special-purpose processors may be ASICs or FPGAs which are general-purpose components that are electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD).

System 110 can include record interface 111 that receives long-term access data from one or more long-term record sources, such as long-term record source 102 and short-term access data from one or more short-term record sources, such as short-term record source 104. Long-term record source 102 may provide long-term access data that includes long-term streaming media records for multiple streaming media sources. Each streaming media record may include: a date on which the streaming media will be streamed; a time period over which the streaming media is expected to be streamed; one or more record characteristics; and an indication of a streaming media source (e.g., a streaming media call sign). Long-term record source 102, which may be a remote server system operated by a third party, may provide long-term access data for streaming media scheduled to be transmitted greater than 7 days in the future and, possibly, up to a year into the future. Examples of long-term record sources include Sportradar® and Thuuz®.

Short-term record source 104 may provide short-term access data that includes short-term streaming media records for multiple streaming media sources. A short-term streaming media record is received after a long-term streaming media record that corresponds to the same streaming media event. Each streaming media record may include: a date; a time period; one or more record categories; an indication of a streaming media source; and geographic region identifiers. Geographic region identifiers may be used to indicate geographic regions (e.g., zip codes, countries, counties, states, etc.) that are either permitted or not permitted to receive a particular instance of streaming media. Despite a region being permitted to receive streaming media from a streaming media source, particular instances of streaming media may be subject to an additional geographic restriction that prevents it from being streamed to a user-access device in particular geographic areas. Short-term record source 104, which may be a remote server system operated by a third party or by the same entity that operates system 110, may provide short-term access data for streaming media scheduled to be transmitted within the next 7 days or less. (In other embodiments, the specific time cut-off between long-term and short-term access data may vary, such as 5 days, 9 days, or some other time duration.) Examples of a short-term record source can include Tivo® and/or a system that also creates electronic programming guide (EPG) data. Short-term access data can be expected to be more definite that long-term access data received from long-term record source 102. Therefore, streaming media records obtained from long-term record source 102 may be updated or superseded by data obtained from short-term record source 104. For instance, while long-term streaming media records may indicate a streaming media source, short-term streaming media records may additionally indicate one or more geographic regions in which a geographic restriction is to be enforced that restricts where the streaming media is permitted to be received.

One or more non-aggregated record sources, such as non-aggregated record source 106 may provide streaming media records to record interface 111. Non-aggregated record source 106 may provide records for a particular streaming media source only. Further, non-aggregated record source 106 may be periodically or occasionally updated, and therefore may output updated streaming media records within 7 days or greater than 7 days.

When long-term access data is received from long-term record source 102 via record interface 111, various normalization processing may be performed on the received data by record reconciliation engine 112. A long-term streaming media record may include: a streaming media source call sign; and one or more record characteristics. A streaming media source call sign can server as a unique identifier for a particular streaming media source. For each long-term streaming media record, the streaming media source call sign may be converted to a normalized streaming media call sign. As an example of this, a streaming media source may go by the call sign of "NSN-NE." While one long-term record source may use NSN-NE as the call sign, some other record source may us "NSNNE." The normalization process may serve to convert the call sign from one or more variations to a normalized call sign. A similar normalization process may be performed on record categories. If the streaming media corresponds to a sports even, the record categories can include one or more team names and/or one or more city or region names. Multiple variations on a team name may be normalized to a particular name used by system 110. For instance, the "LA Dodgers" may be normalized to "L.A. Dodgers" or the "Devil Rays" may be normalized to "Rays." The normalization process can include comparing a received call sign or record characteristics to a table of variations on the call sign or characteristic and selecting a normalized call sign or characteristic mapped to each variation. After the normalization has been performed, the updated long-term records may be stored to master record database 113. In other embodiments, the long-term records may not be normalized until a later time after storage in master record database 113.

Since long-term access data may be received significantly sooner than short-term access data from short-term record source 104, responses to a large percentage of queries received via query interface 116 may be based exclusively on data obtained from one or more long-term record sources, such as long-term record source 102.

When short-term access data is received from short-term record source 104 via record interface 111, similar normalization processing may be performed on the received data by record reconciliation engine 112 that was performed on long-term access data. In addition to normalization of the short-term access data, a process of combining the normalized and previously-stored long-term streaming media records from master record database 113 with short-term streaming media records can be performed. Since short-term streaming media records are more current, conflicting data between short-term access data and long-term access data may be resolved by using the data from the short-term record. Further, short-term streaming media records can include more detailed information that long-term streaming media records, therefore additional detailed information that specifies specific geographical regions where the streaming media content will be available (e.g., based on zip code) may be added to the streaming media record stored to master record database 113.

A schedule normalization process may also be performed by record reconciliation engine 112. For instance, while a short-term streaming media record may indicate that the streaming media will last from 8:30 PM until 10:45 PM, a corresponding long-term streaming media record may indicate that the streaming media will last from 8:45 PM until 10:30 PM. By analyzing the amount of overlap and the difference between start time and end time, a determination can be made as to whether the streaming media records properly correspond to each other.

One or more streaming media permission schemes may be mapped to each streaming media record within master record database 113. Streaming media permission schemes 114 may include multiple possible streaming media permission schemes. Each user-access device or user account may be mapped to a particular streaming media permission scheme. Each streaming media permission scheme of streaming media permission schemes 114 may permit access to a defined set of streaming media sources. Overlap can exist between streaming media permission schemes. For instance, a first streaming media permission scheme may permit access to a list of twenty streaming media sources. A second streaming media permission scheme may permit access to a list of fort streaming media sources, which can includes at least some of the streaming media source that are part of the first streaming media permission scheme. Which one or more streaming media permission schemes allow access to a streaming media source of a streaming media record may be stored to master record database 113.

By a streaming media permission scheme including a streaming media source on which streaming media is to be transmitted does not necessarily guarantee that the user-access device (or other streaming media device of the user) will be permitted access to the streaming media. Rather, further restrictions based on geographical identifiers may be enforced. For example, a streaming media source may be a regional sports streaming media source. While the regional sports streaming media source may be available to a user-access device, a short-term record corresponding to the streaming media source may indicate that regardless of the user-access device having access to the regional sports streaming media source, access to the streaming media will not be provided. Colloquially, this may be referred to as a media blackout.

User-access device 130 may be a computerized device through which a user submits a query to system 110 to determine: 1) whether streaming media corresponding to a particular record characteristic is available for streaming; 2) the streaming media source; 3) the streaming media permission scheme needed to access streaming media corresponding to the particular record characteristic; and 4) whether the streaming media is available based on the geographical location of the user-access device. User-access device 130 may be a cellular phone, a tablet computer, a gaming device, a laptop computer, a desktop computer, or some other form of computerized device. User-access device 130 may also be used to stream media for presentation to user. Alternatively, a separate streaming media player device (e.g., smart television, tablet computer, plug-in streaming media device, etc.) may be used to view streaming media transmitted by streaming media server 140 via network 120. Network 120 may include one or more public and/or private networks, such as the Internet and a home wireless network.

A query submitted by user-access device 130 can include: 1) a record characteristic; and 2) a geographical identifier. The record characteristic may indicate a property of records for which streaming information is desired. For example, the record characteristic may be a city, geographical region, or team name. The geographical identifier may be a zip code, an address, coordinates, a latitude/longitude, or some other location-identifying information.

Query interface 116 may receive the query via network 120. The query may be evaluated and responded to by query engine 115. Query engine 115 may access master record database 113 and identify stored records that match the record characteristic received as part of the query. Query engine 115 may retrieve data from master record database including: dates of records that match the record characteristic; times of records that match the record characteristic; indication of streaming media source linked to the record; and an indication of a streaming media permission scheme needed to view the streaming media corresponding to the record.

Indications of one or more records and the retrieved data may be output to user-access device 130 in response to the query. The output indications may include data that is based solely on long-term streaming media records. Other output indications, such as those occurring within seven days, may be based at least in part on short-term streaming media records. Since short-term streaming media records include information about specific geographic access blackouts, additional information may be included in response to the query, such a narrative stating the situation under which a blackout may occur or that based on the provided geographical identifier, that access to the streaming media associated with a particular record is prohibited regardless of the streaming media permission scheme used to access the streaming media server system.

Figure 2:
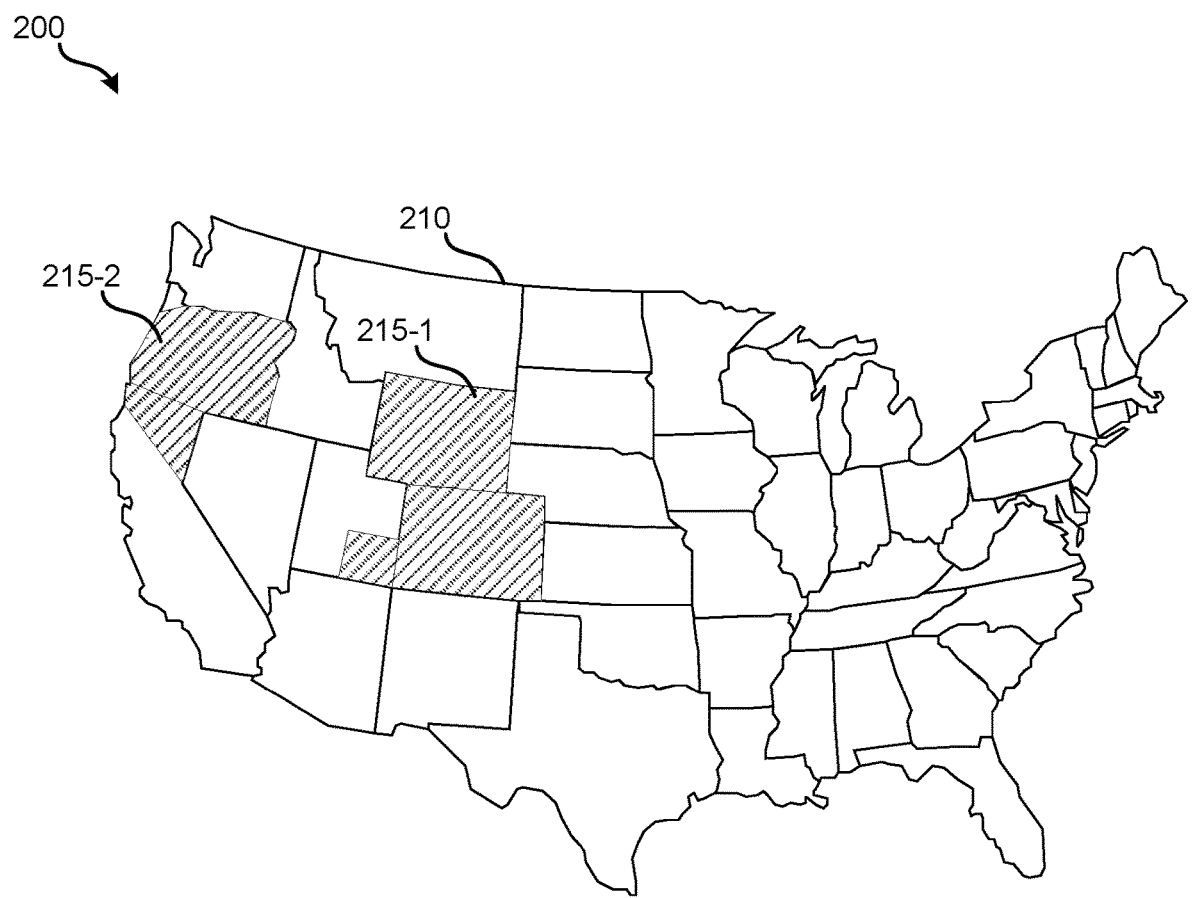
FIG. 2 illustrates an embodiment of a geographic region access restriction.

FIG. 2 illustrates an embodiment 200 of a geographic region access restriction. In embodiment 200, a map of the contiguous United States 210 is presented. Shaded regions are used to indicate geographic regions 215 in which a particular instance of streaming media is permitted to be received. For instance, based on a long-term streaming media record, a determination may be made that a particular record characteristic is mapped to a streaming media source that is only available in geographic region 215-1 and geographic region 215-2. For instance, a regional sports streaming media source that is to stream media corresponding to the particular record characteristic may only permit streaming media to be received in geographic regions 215.

Therefore, in response to a query submitted by a user-access device that indicates the record characteristic and a geographical identifier, a response indication may be provided. The response may indicate the streaming media source and, if access is possible, the streaming media permission scheme required to access the streaming media source. If the geographical identifier provided as part of the query is within geographic regions 215, an indication may be output that the streaming media is available. However, a caveat may be noted in a narrative (or graphically) that access to the streaming media source may be further restricted closer to the date of the streaming media event. If the geographical identifier provided as part of the query is outside geographic regions 215, an indication may be output that the streaming media is not available.

Figure 3:
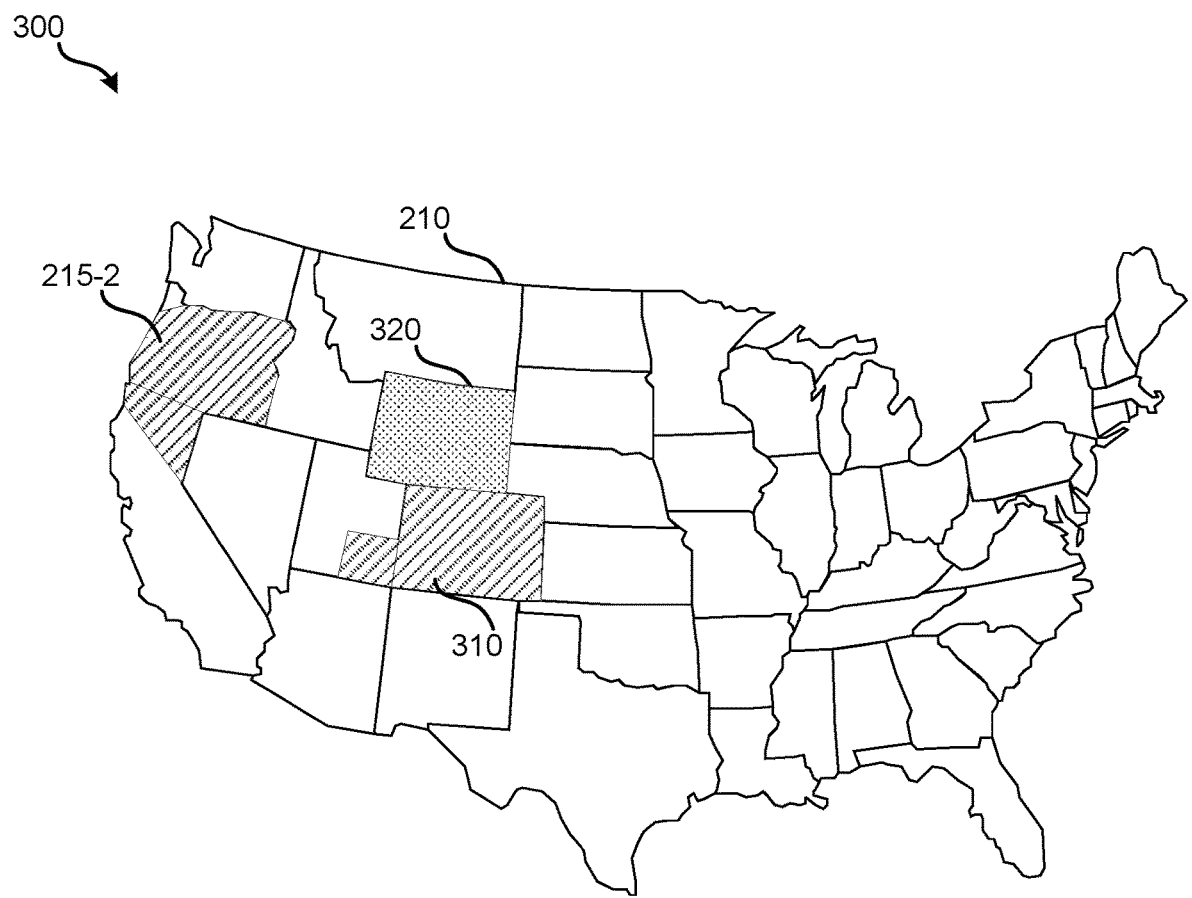
FIG. 3 illustrates another embodiment of a geographic region access restriction.

FIG. 3 illustrates another embodiment 300 of a geographic region access restriction. Embodiment 300 can represent embodiment 200 after the data obtained from the long-term streaming media record of embodiment 200 is updated based on a counterpart short-term streaming media record that includes further data regarding a geographical restrictions that limits access to the streaming media. In embodiment 300, geographic region 215-1 has been divided into two sub-regions: geographic sub-region 310 and geographic sub-region 320. While the long-term streaming media record indicated that a streaming media source that covers all of geographic region 215-1 provided access to the streaming media, a short-term streaming media record has indicated specific geographic areas within the region that are permitted to receive the streaming media source to the exclusion of other regions in which the streaming media source is permitted to be received.

Therefore, in embodiment 300, user-access devices in regions 310 and 215-2 will be permitted to access the streaming media via the streaming media source. However, user-access devices in geographic sub-region 320, despite potentially having the appropriate streaming media permission scheme to access the streaming media source, the streaming media will not be provided. Rather, some other streaming media may be substituted on the streaming media source.

As a definite example of such an arrangement, a regional sports streaming media source may permit streaming within geographic regions 215. This may be a conglomeration of multiple regional sports streaming media sources. For instance, a first regional sports streaming media source may cover geographic region 215-2 while a second, affiliated regional sports streaming media source may cover geographic region 215-1. A long-term streaming media record received from long-term record source 102 may indicate that regions that are permitted to access the regional sports streaming media source are eligible to receive the streaming media. However, a later update to the long-term streaming media record, such as in the form of a short-term streaming media record, may be indicate of a blackout within a geographic region that receives the regional sports streaming media source. In FIG. 3, regional sports streaming media source has been blacked out in geographic sub-region 320. Alternative (or no) streaming media may be provided to geographical sub-region 320. Therefore, in response to a query, a user-access device may only receive an indication of geographic sub-region 320 being blacked out if the query is sent after the short-term streaming media record has been received.

FIG. 4 illustrates an embodiment 400 of graphic user interface defining record access. Embodiment 400 illustrates indications of records that may be output to a user-access device in response to a query. Each entry within the table of embodiment 400 can correspond to data obtained from a streaming media record stored within master record database 113. In embodiment 400, each indication includes various fields of data, including: date/time fields 410; streaming media source field 420; first characteristic 430; second characteristic 440; and streaming media permission scheme 450. Additionally, each indication includes a narrative that provides additional detail on geographic restrictions.

In embodiment 400, a user-access device has been used to submit a query indicative of a record characteristic. In this example, the record characteristic searched for was "Colorado," which for example, could correspond to the Colorado Buffaloes college football team. In response to the query, query engine 115 searches master record database 113 for streaming media records that match the searched characteristic and may indicate accessibility of the streaming media associated with the streaming media record based on a geographical identifier provided by the user-access device as part of the query.

In response to the query, five indications of records 460 are returned. Indication 460-1 is based on non-aggregated access data obtained from a non-aggregated record source. For instance, a national streaming media source, such as ESPN, may provide a dedicated application programming interface (API) to obtain streaming media records. These records may be occasionally updated. Indication 460-2 is based on a short-term streaming media record received from a short-term record source. Indication 460-2, as an included narrative indicates that despite an available streaming media source streaming the streaming media, based on the provided geographic identifier, the streaming media associated with the record of indication 460-2 is not available.

Indication 460-3 stands in contrast to indication 460-2. While a short-term streaming media record has been received for indication 460-2, only a long-term streaming media record has been received for indication 460-3. Since finalized geographic restriction data has not yet been received from indication 460-3, the narrative indicates that a geographic restriction may be enforced and may result in access to the mapped streaming media being blocked from the geographical location indicated by the geographical identifier supplied as part of the query.

Indication 460-4 corresponds to a streaming media source that is not available via streaming media server 140. While indication 460-4 is provided to indicate that the event is occurring, the entry indicates that regardless of geographic location, the event cannot be accessed via the streaming media server. Indication 460-5 indicates an entry where only a long-term streaming media record has been received for the streaming media event. Since a finalized indication of which geographic regions will be eligible to receive the streaming media event has not yet been received as part of a short-term streaming media record, the narrative indicates that a geographic restriction may be put in place.

Figure 5:
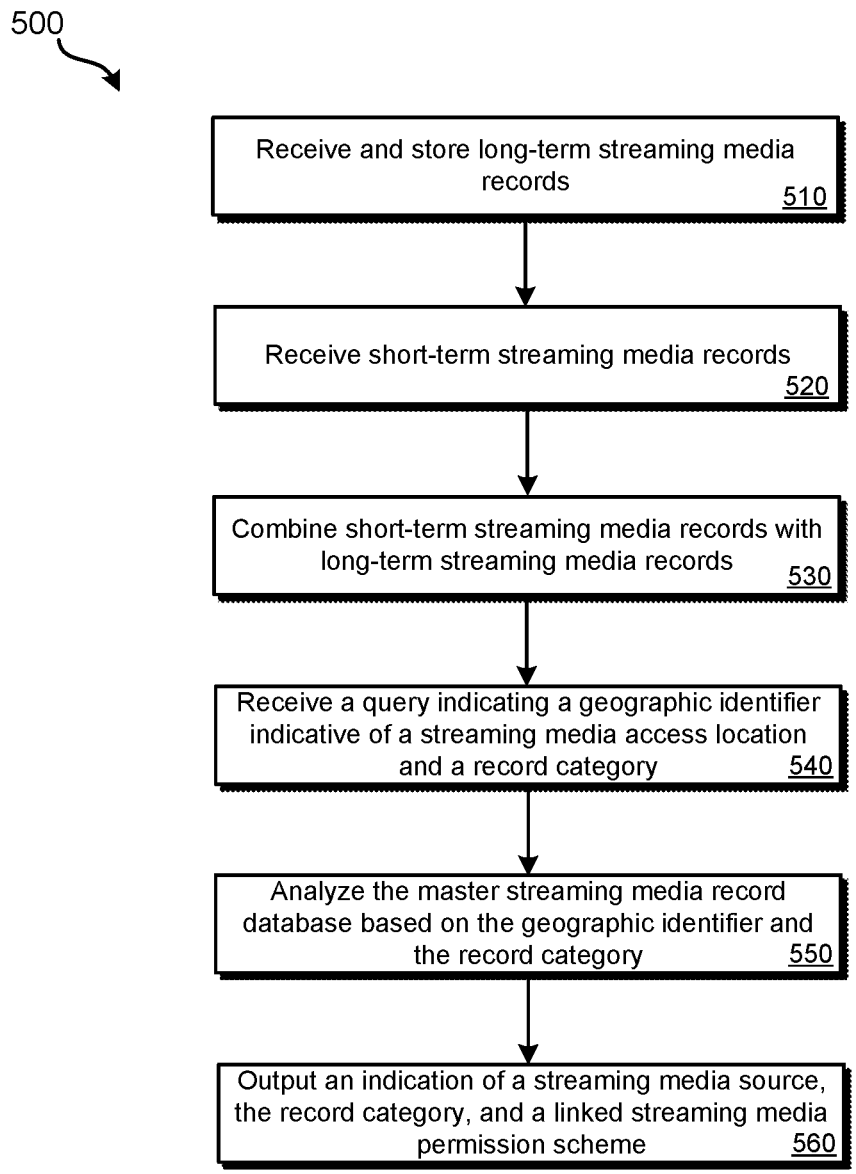
FIG. 5 illustrates an embodiment of a method for geographical-based streaming media access management.

Various methods may be performed using the systems and arrangements detailed in relation to FIGS. 1-4. FIG. 5 illustrates an embodiment of a method 500 for geographical-based streaming media management. The blocks of method 500 may be performed by a geographical-based streaming media access management system, such as system 110 of FIG. 1.

At block 510, one or more long-term streaming media records may be received. A long-term streaming media record can indicate: a streaming media source; a date; a time period; and one or more record characteristics. As previously detailed, a normalization process may be performed on the received long-term record to normalize record characteristics (e.g., team name, city name, streaming media source call sign, etc.). In some embodiments, if it is already known or expected that the streaming media associated with the long-term streaming media record will not be made available in particular areas which are otherwise eligible to receive streaming media from the streaming media source, geographic location identifiers of locations that are either eligible or ineligible to receive the streaming media may be included with the long-term streaming media record. Long-term streaming media records may be received greater than one week in advance from the date and time period of when the streaming media is scheduled to be streamed. Data from the long-term streaming media record may be stored to a master record database maintained by the geographical-based streaming media access management system.

At block 520, one or more short-term streaming media records may be received. A short-term streaming media record may indicate similar information to a long-term streaming media record but may be more exact in its specifics, particularly the geographic locations that are eligible to receive the mapped streaming media. A short-term streaming media record can indicate: a streaming media source; a date; a time; one or more record characteristics; and, if the streaming media associated with the short-term streaming media record will not be made available in particular areas which are otherwise eligible to access the streaming media source, geographic location identifiers of locations that are either eligible or ineligible to receive the streaming media may be included with the short-term streaming media record. As previously detailed, a normalization process may be performed on the received long-term record to normalize record characteristics (e.g., team name, city name, streaming media source call sign, etc.). Short-term streaming media records may be received a week or less in advance from the date and time period of when the streaming media is scheduled to be streamed. Data from the short-term streaming media record may be stored to the master streaming media record database maintained by the geographical-based streaming media access management system. Alternatively, before being saved to the master streaming media record database, the reconciliation process of block 530 may be performed.

While block 510 can involve receiving long-term streaming media records from one or more long-term record sources and block 520 can involve receiving short-term streaming media records from one or more short-term record sources, one or more non-aggregated record sources may be occasionally or periodically accessed to obtain streaming media records corresponding to a particular streaming media source. The data obtained from a non-aggregated record source, may contain similar data and be treated similarly to a long-term or short-term streaming media record.

At block 530, data from a short-term streaming media record that is determined to correspond to a long-term streaming media record may be combined and/or reconciled. For instances of streaming media for which both a long-term streaming media record and a short-term streaming media record has been received, any conflicts may be resolved in favor of the short-term streaming media record. For instance, the short-term streaming media record has more up-to-date information on any geographic regions permitted or blocked from accessing streaming media from a particular streaming media source. Therefore, previously-stored data to the master streaming media record database from a long-term streaming media record can be updated using data from a corresponding short-term streaming media record. As previously detailed, a conciliation process may be performed to resolve minor discrepancies between a long-term and related short-term streaming media record, such as an offset in time period between the short-term and long-term streaming media record. Any records obtained from a non-aggregated record source may similarly be combined and/or reconciled.

At block 540, a query may be received from a user-access device. The query can indicate: a record characteristic indicative of streaming media to be streamed in the future; and a geographical identifier. In some embodiments, the record characteristic may indicate a city or team name. In some embodiments, a particular sport or other form of characteristic may be included as part of the query.

At block 550, in response to receiving the query, the master streaming record database may be accessed for all or up to a predefined number of records that correspond to the record characteristic included in the query. Since only streaming media events scheduled to occur in approximately the next week will have been associated with a received short-term streaming media record, one or more of the results returned in response to the query can be based exclusively on data obtained from long-term streaming media records. Other records, such as those corresponding to an event that will occur within the next week, may be based on combined and/or a reconciled long-term streaming media record and a short-term streaming media record. Based on the date and time of the query, the returned results may correspond to records that include the characteristic occurring soonest in time. The results may be ordered sequentially based on time. As part of the analysis of block 550, the geographic identifier received as part of the query may be analyzed. The geographic identifier may be analyzed to determine if 1) streaming of the streaming media source for a particular record is permitted to the location indicated by the geographic identifier; and 2) even if the geographic identifier is at a location eligible to receive the streaming media source, is the streaming media going to be blacked out from being streamed by the streaming media source for the location indicated by the geographic identifier. A narrative to include in a response may be included based on the analysis.

At block 560, one or more indications that are indicative of one or more corresponding records from the master streaming media record database may be output to the user-access device. Each indication may include: a date; a time; a streaming media source; an indication of one or more streaming media permission schemes that can be used to access the streaming media source; and a narrative. The narrative may give details about whether the geographical location specified in the request is eligible to receive the streaming media mapped to the event and/or whether an update to the geographic region eligible to receive the streaming media event from the streaming media source is expected to be received. In other embodiments, rather than using a narrative, graphical indications may be used to indicate similar information. As an example of such indications, embodiment 400 illustrates five example indications.

Following the indications being presented, streaming media may be streamed by a streaming media server in accordance with the output indications. Therefore, based on the streaming media permission scheme of a user-access device, the streaming media source that is streaming the streaming media, and the geographical location of the user-access device, access to the streaming media may be provided in accordance with the corresponding output indication.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for geographical-based streaming media management, the method comprising:
    receiving, by a cloud-based server system, from a remote server system operated by a third party, a plurality of long-term streaming media records, wherein:
        each long-term streaming media record of the plurality of long-term streaming media records indicates a streaming media source mapped to a streaming media instance linked to the long-term streaming media record; and
        the plurality of long-term streaming media records correspond to streaming media scheduled to be transmitted greater than seven days in the future;
    receiving, by the cloud-based server system, a plurality of short-term streaming media records, wherein:
        the plurality of short-term streaming media records are received after the plurality of long-term streaming media records;
        each short-term streaming media record of the plurality of short-term streaming media records indicates a streaming media source mapped to a streaming media instance linked to the short-term streaming media record;
        each short-term streaming media record of the plurality of short-term streaming media records comprises one or more geographic identifiers, each geographic identifier being indicative of a location where the stream media instance is permitted or not permitted to be streamed; and
        the plurality of short-term streaming media records correspond to streaming media scheduled to be transmitted less than seven days in the future;
    combining, by the cloud-based server system, the plurality of short-term streaming media records with the plurality of long-term streaming media records in a master streaming media record database;
    receiving, by the cloud-based server system from a user-access device, a geographical identifier that indicates a streaming media access location and a record characteristic;
    analyzing, by the cloud-based server system, the geographical identifier, the record characteristic, and the master streaming media record database; and
    outputting, by the cloud-based server system, based on the geographical identifier, the record identifier, a plurality of record indications from the master streaming media record database, wherein each record indication of the plurality of record indications comprises:
        the record characteristic;
        the streaming media source; and
        a streaming media permission scheme required to access the streaming media source based on the geographical identifier.

2. The method for geographical-based streaming media access management of claim 1, wherein:
    at least one of the plurality of record indications is based only on a long-term streaming media record of the plurality of long-term streaming media records; and
    at least one of the plurality of record indications is based on a short-term streaming media record of the plurality of short-term streaming media records.

3. The method for geographical-based streaming media access management of claim 2, wherein combining the plurality of short-term streaming media records with the plurality of long-term streaming media records in the master streaming media record database comprises updating a time period of at least one of the plurality of long-term streaming media records based on the time period of a short-term streaming media record of the plurality of short-term streaming media records.

4. The method for geographical-based streaming media access management of claim 1, further comprising:
    streaming, by the cloud-based streaming media server system, streaming media mapped to the record characteristic and the streaming media source.

5. The method for geographical-based streaming media access management of claim 4, further comprising:
    receiving, by a streaming media player device, the streaming media mapped to the record characteristic and the streaming media source based on the user-access device being mapped to the streaming media permission scheme required to access the streaming media source based on the geographical identifier.

6. The method for geographical-based streaming media access management of claim 3, wherein combining the plurality of short-term streaming media records with the plurality of long-term streaming media records comprises:
    resolving characteristic and streaming media source mismatches between the plurality of short-term streaming media records and the plurality of long-term streaming media records.

7. The method for geographical-based streaming media access management of claim 1, wherein a long-term streaming media record defines a first geographic region excluded from permission to access to the streaming media.

8. The method for geographical-based streaming media access management of claim 7, wherein a short-term streaming media record of the plurality of short-term streaming media records defines a second geographic region that is excluded from permission to access the record characteristic.

9. The method for geographical-based streaming media access management of claim 1, wherein the geographical identifier is a zip code.

10. The method for geographical-based streaming media access management of claim 1, wherein the streaming media permission scheme defines access to a plurality of streaming media sources.

11. A geographical-based streaming media management system comprising:

one or more processors; and
a memory communicatively coupled with and readable by the one or more processors and having stored therein processor-readable instructions which, when executed by the one or more processors, cause the one or more processors to:
receive a plurality of long-term streaming media records, wherein:
  each long-term streaming media record of the plurality of long-term streaming media records indicates a streaming media source mapped to a streaming media instance linked to the long-term streaming media record; and
  the plurality of long-term streaming media records correspond to streaming media scheduled to be transmitted greater than seven days in the future;
receive a plurality of short-term streaming media records, wherein:
  the plurality of short-term streaming media records are received after the plurality of long-term streaming media records;
  each short-term streaming media record of the plurality of short-term streaming media records indicates a streaming media source mapped to a streaming media instance linked to the short-term streaming media record;
  each short-term streaming media record of the plurality of short-term streaming media records comprises one or more geographic identifiers, each geographic identifier being indicative of a location where the stream media instance is permitted or not permitted to be streamed; and
  the plurality of short-term streaming media records correspond to streaming media scheduled to be transmitted less than seven days in the future;
combine the plurality of short-term streaming media records with the plurality of long-term streaming media records in a master streaming media record database, wherein the mast streaming media record database is stored using one or more non-transitory processor-readable mediums;
receive, from a user-access device, a geographical identifier that indicates a streaming media access location and a record characteristic;
analyze the geographical identifier, the record characteristic, and the master streaming media record database; and
output, based on the geographical identifier, the record identifier, a plurality of record indications from the master streaming media record database, wherein each record indication of the plurality of record indications comprises:
  the record characteristic;
  the streaming media source; and
  a streaming media permission scheme required to access the streaming media source based on the geographical identifier.

12. The geographical-based streaming media management system of claim 11, wherein:
at least one of the plurality of record indications is based only on a long-term streaming media record of the plurality of long-term streaming media records; and
at least one of the plurality of record indications is based on a short-term streaming media record of the plurality of short-term streaming media records.

13. The geographical-based streaming media management system of claim 12, wherein the processor-readable instructions which, when executed by the one or more processors, further cause the one or more processors to update a time period of at least one of the plurality of long-term streaming media records based on the time period of a short-term streaming media record of the plurality of short-term streaming media records.

14. The geographical-based streaming media management system of claim 11, further comprising:
a streaming media server that streams streaming media mapped to the record characteristic and the streaming media source.

15. The geographical-based streaming media management system of claim 14, further comprising:
a streaming media player device that receives the streaming media mapped to the record characteristic and the streaming media source based on the user-access device being mapped to the streaming media permission scheme required to access the streaming media source based on the geographical identifier.

16. The geographical-based streaming media management system of claim 13, wherein the processor-readable instructions which, when executed by the one or more processors, further cause the one or more processors to resolve characteristic and streaming media source mismatches between the plurality of short-term streaming media records and the plurality of long-term streaming media records.

17. The geographical-based streaming media management system of claim 11, wherein a long-term streaming media record defines a first geographic region excluded from permission to access to the streaming media.

18. The geographical-based streaming media management system of claim 17, wherein a short-term streaming media record of the plurality of short-term streaming media records defines a second geographic region that is excluded from permission to access the record characteristic.

19. The geographical-based streaming media management system of claim 11, wherein the streaming media permission scheme defines access to a plurality of streaming media sources.

20. A non-transitory processor-readable medium for geographical-based streaming media management comprising processor-readable instructions configured to cause one or more processors to:
receive, from a remote server system operated by a third party, a plurality of long-term streaming media records, wherein:
  each long-term streaming media record of the plurality of long-term streaming media records indicates a streaming media source mapped to a streaming media instance linked to the long-term streaming media record; and
  the plurality of long-term streaming media records correspond to streaming media scheduled to be transmitted greater than seven days in the future;
receive a plurality of short-term streaming media records, wherein:
  the plurality of short-term streaming media records are received after the plurality of long-term streaming media records;
  each short-term streaming media record of the plurality of short-term streaming media records indicates a streaming media source mapped to a streaming media instance linked to the short-term streaming media record;
  each short-term streaming media record of the plurality of short-term streaming media records comprises one or more geographic identifiers, each geographic identifier being indicative of a location where the stream media instance is permitted or not permitted to be streamed; and the plurality of short-term streaming media records correspond to streaming media scheduled to be transmitted less than seven days in the future;

combine the plurality of short-term streaming media records with the plurality of long-term streaming media records in a master streaming media record database;

receive, from a user-access device, a geographical identifier that indicates a streaming media access location and a record characteristic;

analyze the geographical identifier, the record characteristic, and the master streaming media record database; and output based on the geographical identifier, the record identifier, a plurality of record indications from the master streaming media record database, wherein each record indication of the plurality of record indications comprises:

the record characteristic;

the streaming media source; and a streaming media permission scheme required to access the streaming media source based on the geographical identifier.

* * * * *